Patented May 22, 1934

1,959,844

UNITED STATES PATENT OFFICE 1,959,844

METALLIFEROUS AZO-DYESTUFFS AND PROCESS OF MAKING SAME

Fritz Straub and Hans Mayer, Basel, Switzerland, assignors to Society of Chemical Industry in Basle, Basel, Switzerland No Drawing. Application June 24, 1930, Serial No. 463,564. In Switzerland July 3, 1929

12 Claims. (Cl. 260—11)

The present invention relates to the manufacture of new metalliferous azo-dyestuffs. It comprises the process of making these dyestuffs and the dyestuffs themselves.

According to this invention new metallifierous azo-dyestuffs are obtained by treating with water-soluble agents yielding metals the atomic weight of which is higher than 53, in a medium the pH of which is not higher than 10, unsulfonated azo-dyestuffs of the general formula

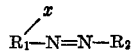

wherein $R_1$ and $R_2$ are unsulfonated aryl residues, $R_2$ containing at least one hydroxyl group, and $x$ is such a group in ortho-position to the —N=N— bridge which, in combination with this —N=N— bridge, renders the dyestuff adapted to bind metals capable of forming lakes. The dyestuffs which are to be metallized are made by combination of an unsulfonated diazo-compound containing an OH- or COOH-group in ortho-position to the —N=N— group with an unsulfonated hydroxy-compound of the benzene or naphthalene series or with a dihydroxyquinoline.

As agents yielding metal there are inter alia suitable the metal compounds of Mn, Fe, Co, Ni and Cu, with the exception of chromium. They may be used as organic metal compounds in presence or absence of organic or inorganic added substances, or as inorganic metal compounds in presence or absence of organic or inorganic added substances.

Similar products are obtained if instead of converting the finished dyestuff into a metal compound as described above, the complex metal compound of an unsulfonated ortho-hydroxydiazo-compound is first produced and this then combined with an unsulfonated coupling component to form the metalliferous azo-dyestuff.

The metalliferous dyestuffs obtainable by the invention are useful for making colored varnishes fast to light, having a cellulose ester or ether or an artificial or natural resin as basis.

The following examples illustrate the invention, the parts being by weight:—

Example 1

2.74 parts of the dyestuff

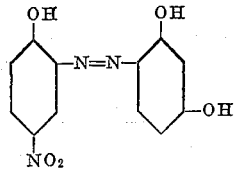

from diazotized 4-nitro-2-amino-1-phenol and resorcinol are dissolved in 250 parts of hot water and the solution is heated for some time to boiling in a reflux apparatus with a quantity of cobalt formate corresponding with 0.65 part of cobalt. After cooling, the dyestuff which has separated is filtered, washed and dried at a moderate temperature. The cobalt compound of the above dyestuff thus obtained is a green-black powder sparingly soluble in water, freely soluble in caustic soda solution or concentrated sulfuric acid to a deep red or brown yellow solution respectively. Its deep red solution in nitrocellulose varnish yields a vivid scarlet red coating of very good fastness to light.

When copper acetate is substituted for the cobalt salt, there is obtained a yellow red varnish.

Example 2

2.63 parts of the dyestuff

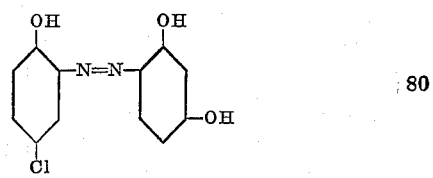

from diazotized 4-chloro-2-amino-1-phenol and resorcinol are heated in 250 parts of water for some time in a reflux apparatus to boiling with a quantity of nickel sulfate corresponding with 0.64 part of nickel, there being added an equivalent quantity of sodium formate. After cooling, the dyestuff which has separated is filtered, washed and dried at moderate temperature. The product is a yellow brown powder, which dissolves sparingly in water and in causic soda solution to a deep red solution and in concentrated sulfuric acid to a brown yellow solution. Its orange solution in nitro-cellulose varnish yields a brownish orange coating.

Instead of sodium formate any other alkali salt of an organic mono- or poly-carboxylic acid may be used, such as sodium acetate or potassium tartrate or a mixture thereof. Also a mixture of sodium acetate and sodium oxalate.

Similar metal lakes are obtained with nickel acetate with addition of inorganic salts, such as sodium sulfate, sodium chloride, secondary and tertiary sodium phosphate or organic salts, such as sodium formate, sodium acetate or suitable mixtures thereof.

Example 3

7.2 parts of 4-chloro-2-amino-1-phenol are diazotized as usual and the diazo-compound is neutralized cold and transformed by means of a quantity of cobaltous chloride, corresponding with 3 parts of cobalt, into a diazo-compound containing cobalt. This compound is then coupled with an alkaline solution of β-naphthol. There is produced directly the cobalt lake of the dyestuff, which after filtration and washing is dried at a moderate temperature. The properties of the colour lake are the same as those of the product obtained in a normal manner by treating with cobalt the finished dyestuff

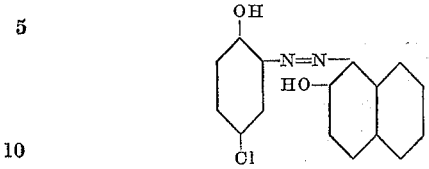

from diazotized 4-chloro-2-amino-1-phenol and β-naphthol.

Instead of cobalt other metal salts, such as zinc, nickel or copper sulfate can be used, analogous products being obtained.

*Example 4*

2.74 parts of the dyestuff

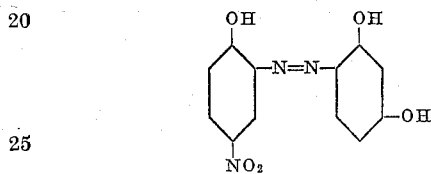

from diazotized 4-nitro-2-amino-1-phenol and resorcinol are dissolved in 200 parts of hot water and after addition of 7.5 parts of sodium sulfite and a quantity of ferric chloride corresponding with 0.62 part of iron, the solution is boiled for some time. The hydrochloric acid liberated by the formation of the color lake is neutralized by the sodium sulfite present, whereby $SO_2$ is evolved. After cooling the separation of the dyestuff is completed by addition of a little common salt; filtration and thorough washing follow. The product is then dried, in which condition it is a dark brown powder, sparingly soluble in water but soluble in caustic soda solution to a deep brown solution and in concentrated sulfuric acid to an orange solution. Its brown solution in nitrocellulose varnish yields on metal surfaces a vivid brown coating very fast to light.

If other metal salts are used instead of ferric chloride, for instance cobaltous chloride, the corresponding metal compounds are obtained, that produced with cobalt for example being a very fast scarlet red lake.

*Example 5*

2.63 parts of the dyestuff

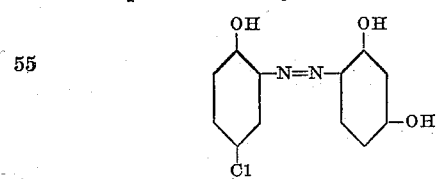

from diazotized 4-chloro-2-amino-1-phenol and resorcinol are dissolved in 200 parts of water and the solution is heated to boiling for some hours with 4 parts of ferric oxalate and a quantity of sodium acetate which is two-thirds of that equivalent to the ferric oxalate. The iron compound produced separates in greater part, the separation being completed after cooling by addition of common salt. When dry it is a dark brown powder, sparingly soluble in water but freely soluble in caustic soda solution to a deep brown red solution and in concentrated sulfuric acid to a brown solution. Its brown solution in nitrocellulose varnish yields on metal surfaces a brown coating of good fastness to light.

Instead of iron oxalate an oxalate of another metal may be used and instead of sodium acetate the sodium salt of another organic acid may be used. Also analogous metal compounds are produced by means of metal salts of organic acids with addition of less than the equivalent quantity of sodium oxalate.

As acid binding additions are also suitable the alkali salts of other organic poly-carboxylic acids or oxy-carboxylic acids, such as sodium malonate, sodium citrate or sodium succinate.

What we claim is:—

1. Process for the manufacture of unsulfonated metalliferous azo-dyestuffs, consisting in treating with water-soluble agents yielding metals, which metals have an atomic weight between 55 and 66, in a medium the pH of which is not higher than 10, unsulfonated azo-dyestuffs of the general formula

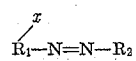

wherein $R_1$ is an unsulfonated benzene radicle, $R_2$ an unsulfonated benzene or naphthalene radicle containing at least one hydroxyl group, and $x$ such a group in ortho-position to the —N=N— bridge which, in combination with this —N=N— bridge, renders the dyestuff adapted to bind metals capable of forming lakes.

2. Process for the manufacture of unsulfonated metalliferous azo-dyestuffs, consisting in treating with water-soluble agents yielding metals, which metals have an atomic weight between 55 and 66, in a medium the pH of which is not higher than 10, unsulfonated azo-dyestuffs of the general formula

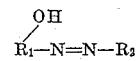

wherein $R_1$ is an unsulfonated benzene radicle and $R_2$ an unsulfonated benzene or naphthalene radicle containing at least one hydroxyl group, the OH-group of the benzene radicle $R_1$ standing in ortho-position to the —N=N— bridge.

3. Process for the manufacture of unsulfonated metalliferous azo-dyestuffs, consisting in treating with water-soluble agents yielding metals, which metals have an atomic weight between 55 and 66, in a medium the pH of which is not higher than 10, unsulfonated azo-dyestuffs of the general formula

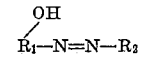

wherein $R_1$ and $R_2$ are unsulfonated benzene radicles, $R_2$ containing at least one hydroxyl group, and the OH-group of the benzene radicle $R_1$ standing in ortho-position to the —N=N— bridge.

4. Process for the manufacture of unsulfonated metalliferous azo-dyestuffs, consisting in treating with water-soluble agents yielding metals the atomic weights of which lie between 55 and 59, in a medium the pH of which is not higher than 10, unsulfonated azo-dyestuffs of the general formula

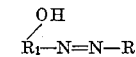

wherein $R_1$ and $R_2$ are unsulfonated benzene radicles, $R_2$ containing at least one hydroxyl group, and the OH-group of the benzene radicle $R_1$ standing in ortho-position to the —N=N— bridge.

5. Process for the manufacture of unsulfonated metalliferous azo-dyestuffs, consisting in treating with water-soluble agents yielding metals the atomic weights of which lie between 55 and 59, in a medium the pH of which is not higher than 10, unsulfonated azo-dyestuffs of the general formula

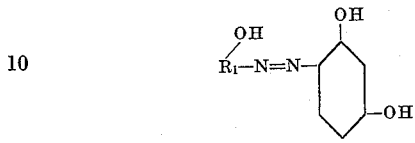

wherein $R_1$ is an unsulfonated benzene radicle the OH-group of which stands in ortho-position to the —N=N— bridge.

6. Process for the manufacture of an unsulfonated ferriferous azo-dyestuff, consisting in treating with a water-soluble agent yielding iron, in a neutral medium, the unsulfonated azo-dyestuff of the formula

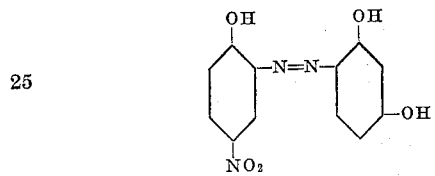

7. The unsulfonated metalliferous azo-dyestuffs of the general formula

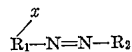

wherein $R_1$ is an unsulfonated benzene radicle, $R_2$ an unsulfonated benzene or naphthalene radicle containing at least one hydroxyl group, and $x$ such a group in ortho-position to the —N=N— bridge which, in combination with this —N=N— bridge, contains bound metals of the atomic weight from 55 to 66, which products are green black to yellow-brown to dark brown powders, dissolving in caustic soda solution to deep red to deep brown solutions, in concentrated sulfuric acid to orange to brown-yellow to brown solutions, and in the usual commercial pyroxyline varnishes to brownish-orange to yellow-red to scarlet-red to brown solutions.

8. The unsulfonated metalliferous azo-dyestuffs of the general formula

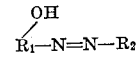

wherein $R_1$ is an unsulfonated benzene radicle and $R_2$ an unsulfonated benzene or naphthalene radicle containing at least one hydroxyl group, and the OH-group of the benzene radicle $R_1$ standing in ortho-position to the —N=N— bridge, contains bound metals of the atomic weight from 55 to 66, which products are green black to yellow-brown to dark brown powders, dissolving in caustic soda solution to deep red to deep brown solutions, in concentrated sulfuric acid to orange to brown-yellow to brown solutions, and in the usual commercial pyroxyline varnishes to brownish-orange to yellow-red to brown solutions.

9. The unsulfonated metalliferous azo-dyestuffs of the general formula

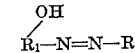

wherein $R_1$ and $R_2$ are unsulfonated benzene radicles, $R_2$ containing at least one hydroxyl group, and the OH-group of the benzene radicle $R_1$ standing in ortho-position to the —N=N— bridge, in combination with this —N=N— bridge, contains bound metals of the atomic weight from 55 to 66, which products are green-black to yellow-brown to dark-brown powders, dissolving in caustic soda solution to deep-red to deep-brown solutions, in concentrated sulfuric acid to orange to brown-yellow to brown solutions, and in the usual commercial pyroxyline varnishes to brownish-orange to yellow-red to scarlet-red to brown solutions.

10. The unsulfonated metalliferous azo-dyestuffs of the general formula

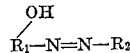

wherein $R_1$ and $R_2$ are unsulfonated benzene radicles, $R_2$ containing at least one hydroxyl group, and the OH-group of the benzene radicle $R_1$ standing in ortho-position to the —N=N— bridge, in combination with this —N=N— bridge, contains bound metals of the atomic weight between 55 and 59, which products are green-black to yellow-brown to dark-brown powders, dissolving in caustic soda solution to deep red to deep brown solutions, in concentrated sulfuric acid to orange to brown-yellow to brown solutions, and in the usual commercial pyroxyline varnishes to brownish-orange to yellow-red to scarlet-red to brown solutions.

11. The unsulfonated metalliferous azo-dyestuffs of the general formula

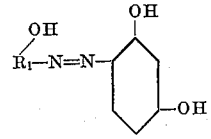

wherein $R_1$ is an unsulfonated benzene radicle the OH-group of which standing in ortho-position to the —N=N— bridge, in combination with this —N=N— bridge, contains bound metals of the atomic weight between 55 and 59, which products are green-black to yellow-brown to dark-brown powders, dissolving in caustic soda solution to deep red to deep brown solutions, in concentrated sulfuric acid to orange to brown-yellow to brown solutions, and in the usual commercial pyroxyline varnishes to brownish-orange to yellow-red to scarlet-red to brown solutions.

12. The unsulfonated ferriferous azo-dyestuff of the formula

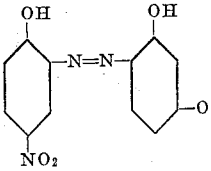

wherein the OH-group of the benzene nucleus carrying the nitro-group, in combination with the —N=N— bridge, contains bound iron, which product is a dark brown powder, dissolving in caustic soda solution to a deep brown solution, in concentrated sulfuric acid to an orange solution, and in the usual commercial pyroxyline varnishes to a brown solution.

FRITZ STRAUB.
HANS MAYER.